United States Patent
Higuchi et al.

(10) Patent No.: US 7,404,424 B2
(45) Date of Patent: Jul. 29, 2008

(54) PNEUMATIC TIRE WITH BUFFER RUBBER LAYER

(75) Inventors: Tadashi Higuchi, Hiratsuka (JP); Daisuke Kanenari, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/543,811

(22) PCT Filed: Jul. 15, 2004

(86) PCT No.: PCT/JP2004/010427

§ 371 (c)(1), (2), (4) Date: Aug. 1, 2005

(87) PCT Pub. No.: WO2005/007423

PCT Pub. Date: Jan. 27, 2005

(65) Prior Publication Data

US 2006/0144495 A1 Jul. 6, 2006

(30) Foreign Application Priority Data

Jul. 17, 2003 (JP) .............................. 2003-198567

(51) Int. Cl.
*B60C 1/00* (2006.01)
*B60C 5/12* (2006.01)
*B60C 5/14* (2006.01)

(52) U.S. Cl. ..................... 152/458; 152/510; 152/549

(58) Field of Classification Search ................ 152/458, 152/510, 549
See application file for complete search history.

(56) References Cited

U.S. PATENT DOCUMENTS

| 3,244,214 | A | * | 4/1966 | Bush | 152/458 |
| 3,871,432 | A | * | 3/1975 | Lachut | 152/458 |
| 6,079,466 | A | * | 6/2000 | Watanabe et al. | 152/510 |
| 6,123,132 | A | * | 9/2000 | Appleton | 152/458 |
| 6,134,132 | A | | 10/2000 | Janssen et al. | |

FOREIGN PATENT DOCUMENTS

| JP | 59-120501 A | 7/1984 |
| JP | 61-110602 A | 5/1986 |
| JP | 10-245452 A | 9/1998 |
| JP | 11-245613 A | 9/1999 |

OTHER PUBLICATIONS

English translation of JP 61-110602 A, May 28, 1986.*
PCT International Search Report for PCT/JP2004/010427 mailed on Oct. 19, 2004.

* cited by examiner

*Primary Examiner*—Adrienne C. Johnstone
(74) *Attorney, Agent, or Firm*—Connolly Bove Lodge & Hutz LLP

(57) ABSTRACT

A pneumatic tire using an inner liner layer comprising a film of a thermoplastic resin, or a blend of a thermoplastic resin and an elastomer, having an air permeation coefficient of not more than $25 \times 10^{-12}$ cc·cm/cm$^2$·sec·cmHg and a Young's modulus of 1 to 1000 MPa, wherein a buffer rubber layer containing short fibers is arranged between the inner liner layer and a carcass layer in bead directions from two ends of a widest width belt layer in ranges of at least 20 mm, whereby a problem of trouble during production is solved and the durability of the inner liner layer is improved, without causing a problem of an increase in tire weight.

3 Claims, 2 Drawing Sheets

PNEUMATIC TIRE WITH BUFFER RUBBER LAYER

TECHNICAL FIELD

The present invention relates to a pneumatic tire, more particularly relates to a light weight pneumatic tire having a good durability, without causing production trouble (or spread cord).

BACKGROUND ART

Pneumatic tires have the problem at the time of tire production that the cord of the carcass layer projects out to the side of the inner liner layer, particularly at the shoulder and breaks the inner liner layer (i.e., spread cord). To deal with such breakage of the inner liner layer, the known method is to provide a tie rubber layer between the inner liner layer and the carcass layer, but this method causes the problem of an increase in the tire weight. As a prior art related to the present invention, for example, Japanese Unexamined Patent Publication (Kokai) No. 59-120501 describes an example of a tie rubber formulation.

DISCLOSURE OF INVENTION

Accordingly, an object of the present invention is to solve the above-mentioned problem of trouble at the time of production of a pneumatic tire and provide a pneumatic tire having improved durability of the inner liner layer, without causing a problem of the increase in the tire weight.

In accordance with the present invention, there is provided a pneumatic tire using an inner liner layer comprising a film of a thermoplastic resin, or a blend of a thermoplastic resin and an elastomer, having an air permeation coefficient of not more than $25 \times 10^{-12}$ cc·cm/cm$^2$·sec·cmHg and a Young's modulus of 1 to 1000 MPa wherein a buffer rubber layer containing short fibers is arranged between the inner liner layer and a carcass layer in bead directions from two ends of a widest width belt layer in ranges of at least 20 mm.

BEST MODE FOR CARRYING OUT THE INVENTION

Figure 1:
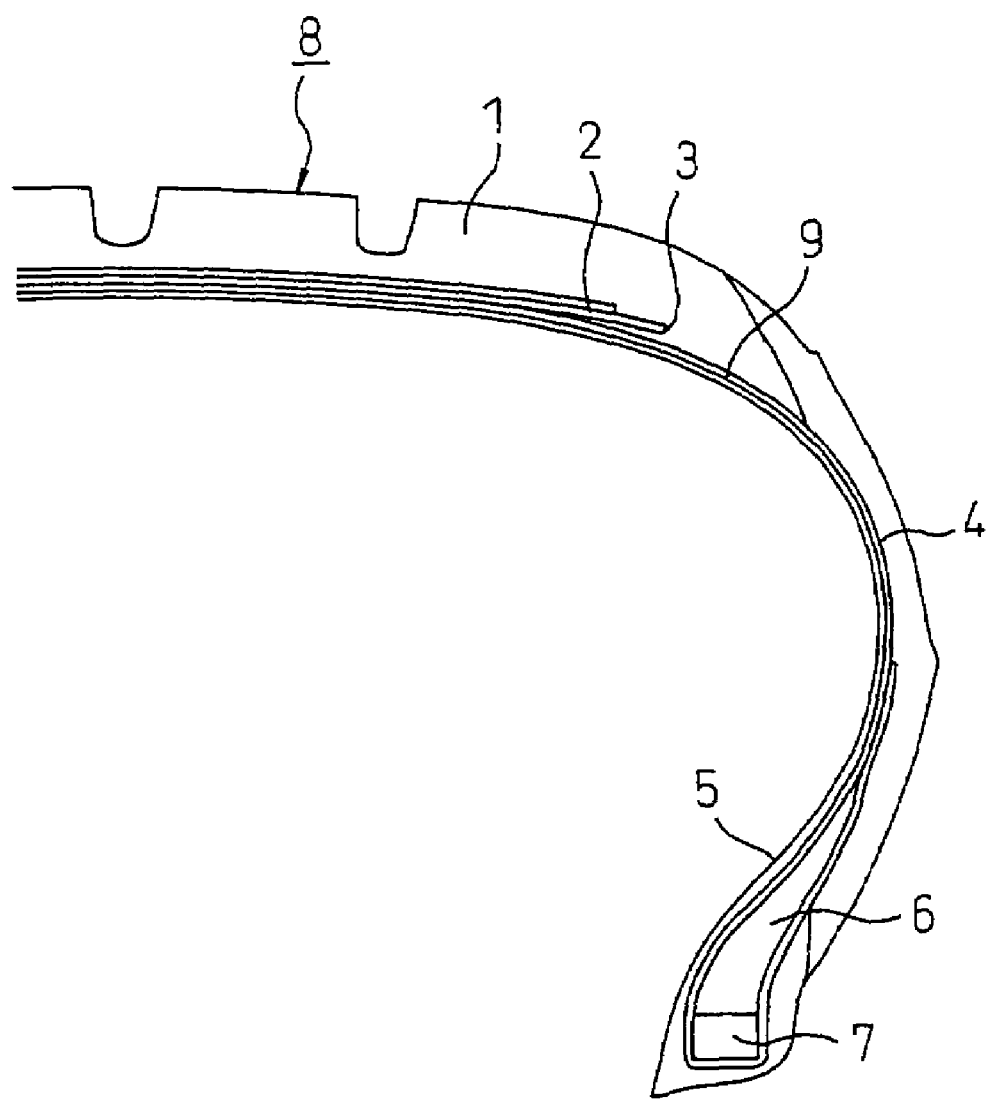
FIG. 1 is a view of the cross-sectional explanatory view in the meridial direction of an example of a pneumatic tire of the present invention.

The inventors engaged in research so as to achieve the above object and, as a result, found that by blending short fibers into a buffer rubber layer corresponding to the conventional tie rubber and suppressing shrink of the cords of the carcass layer, it is possible to decrease the gauge of the buffer rubber layer (i.e., decrease in the thickness), suppress an increase in weight and ensure the durability of the inner liner layer.

The region, where the spread cord occurs when producing a pneumatic tire, is in almost all cases the region where the radius of curvature R of the carcass line of the tire shoulder becomes the minimum.

The gauge (i.e., thickness) of a conventional tie rubber layer is generally 0.1 to 1.4 mm. If the thickness is less than 0.1 mm, it is not possible to suppress the spread cord. Conversely, if more than 1.4 mm, the inherent object of the effect of lightening the weight is impaired, and therefore, this is not preferable. The preferable gauge is at least 0.1 mm to less than 0.5 mm.

The regions where the buffer rubber layer according to the present invention are in the ranges of at least 20 mm from the two ends (i.e., belt layer edges) of the widest belt layer in at least one belt layer in the directions of the tire bead (outside). If provided there, it was found that the spread cord can be suppressed and the durability of the inner liner layer can be improved. Of course, in the same way as the conventional tie rubber layer, the buffer rubber layer of the present invention does not pose any particular problem even if provided from the bead of one end to the bead of the other end unless there is a problem of decreasing the tire weight.

The content of the short fibers (or staple fibers) included in the buffer rubber layer according to the present invention is preferably 1 to 30 parts by weight, more preferably 1 to 20 parts by weight, based upon 100 parts by weight of rubber of the buffer rubber layer. If the content is less than 1 part by weight, the effect of suppression of the spread cord is insufficient and the improvement in the durability is liable to become insufficient. Conversely, if more than 30 parts by weight, a problem is liable to arise in processability, and therefore this is sometimes not preferable.

The buffer rubber layer according to the present invention, as explained above, is formed by dispersing short fibers in a base rubber. The rubber is not particularly limited, but, for example, diene-based rubbers and the hydrogenation products thereof (e.g., various types of natural rubber (NR), various types of polyisoprene rubber (IR), various types of epoxylated natural rubber (ENR), various types of styrene-butadiene copolymer rubber (SBR), various types of polybutadiene rubber (high cis-BR and low cis-BR), various types of nitrile rubber (NBR), various types of hydrogenated NBR, hydrogenated SBR), various types of other elastomers, for example, various types of olefin-based rubber (e.g., ethylenepropylene rubber (EPDM, EPM), various types of maleic-acid modified ethylenepropylene rubber (M-EPM), various types of butyl rubber (IIR), various types of isobutylene-based rubber (e.g., brominated butyl rubber (Br-IIR), various types of chlorinated butyl rubber (Cl-IIR), various types of brominated isobutylene-p-methylstyrene copolymers (Br-IPMS), various types of chlorosulfonated polyethylene (CSM), various types of chlorinated polyethylene (CM), various types of maleic acid-modified chlorinated polyethylene (M-CM)], various types of thermoplastic elastomers (e.g., styrene-based elastomers, olefin-based elastomers, ester-based elastomers], etc. may be mentioned. These may be used alone or in any combination thereof. Among these, it is preferable to use at least one rubber selected from a natural rubber, a polyisoprene rubber, a polybutadiene rubber, or a conjugated diene-aromatic vinyl copolymer rubber.

The short fibers dispersed in the buffer rubber layer according to the present invention are not particularly limited, but having at least two types of polymers forming an island-in-sea structure in fiber lateral cross-section, without mixing with each other, and having mechanical shear force at least partially separate the sea component and island components to enable fibrillation has a great effect on dispersability into the rubber and reinforcement, and therefore is preferable. As the polymer forming the short fibers, a polyester, polyvinyl alcohol, nylon, polyethylene, polypropylene, cellulose, polybutadiene, aromatic polyamide, rayon, polyacrylate, poly-p-phenylene benzibisoxazole, poly-p-phenylene benzibisthiazole, etc. may be mentioned as preferable examples. The dimensions of the short fibers used are also as usual and not particularly limited, but preferably are 0.01 to 10 μm (diameter)×0.1 to 5 mm (length).

The film forming the inner liner layer of the pneumatic tire according to the present invention has an air permeation coefficient of $25 \times 10^{-12}$ cc·cm/cm²·sec·cmHg or less, preferably $5 \times 10^{-12}$ cc·cm/cm²·sec·cmHg or less. The thickness of the film is preferably 0.02 mm or more from the viewpoint of the shapeability, is preferably 1.1 mm or less, more preferably is 0.05 to 0.2 mm, from the point of decrease in the weight. If the air permeation coefficient of the film is more than $25 \times 10^{-12}$ cc·cm/cm²·sec·cmHg, this is not preferable for decreasing the weight of the pneumatic tire. Further, if the Young's modulus is too low, the shapeability is decreased due to the occurrence of wrinkles, elongation, etc. at the time of tire shaping. Conversely, if too high, a problem occurs in durability, and therefore this is also not preferable.

The thermoplastic resin may be made any material having an air barrier action. As such a thermoplastic resin, for example, the following thermoplastic resins or any polymer mixtures thereof or any polymer mixtures thereof and elastomers etc. may be mentioned.

Polyamide-based resins (e.g., Nylon 6 (N6), Nylon 66 (N66), Nylon 46 (N46), Nylon 11 (N11), Nylon 12 (N12), Nylon 610 (N610), Nylon 612 (N612), Nylon 6/66 copolymer (N6/66), Nylon 6/66/610 copolymer (N6/66/610), Nylon MXD6 (MXD6), Nylon 6T, Nylon 6/6T copolymer, Nylon 66/PP copolymer, and Nylon 66/PPS copolymer), and their N-alkoxyalkylates, for example, a methoxymethylate of 6-nylon, a methoxymethylate of 6-610-nylon, a methoxylate of 612-nylon, polyester-based resins (e.g., polybutylene terephthalate (PBT), polyethylene terephthalate (PET), polyethylene isophthalate (PEI), PET/PEI copolymer, polyarylate (PAR), polybutylene naphthalate (PBN), liquid crystal polyester, polyoxyalkylene diimidodiacid/polybutylene terephthalate copolymer, or other aromatic polyesters), polynitrile-based resins (e.g., polyacrylonitrile (PAN), polymethacrylonitrile, acrylonitrile/styrene copolymer (AS), methacrylonitrile/styrene copolymer, methacrylonitrile/styrene/butadiene copolymer), poly(meth)acrylate-based resins (e.g., polymethyl methacrylate (PMMA) and polyethyl methacrylate), polyvinyl-based resins (e.g., vinyl acetate, polyvinyl alcohol (PVA), vinyl alcohol/ethylene copolymer (EVOH), polyvinylidene chloride (PDVC), polyvinyl chloride (PVC), polyvinyl chloride/vinylidene chloride copolymer, vinylidene chloride/methyl acrylate copolymer), cellulose-based resins (e.g., cellulose acetate and cellulose acetobutyrate), fluorine-based resins (e.g., polyvinylidene fluoride (PVDF), polyvinyl fluoride (PVF), polychlorofluoroethylene (PCTFE), and tetrafluoroethylene/ethylene copolymer), and imide-based resins (e.g., aromatic polyimide (PI)) may be mentioned.

The elastomer capable of blending with said thermoplastic resin is not particularly limited, so long as the blend has the above air permeation coefficient and Young's modulus, but, for example, the following may be mentioned:

Diene-based rubbers and their hydrogenates (e.g., NR, IR, epoxylated natural rubber, SBR, BR (high cis-BR and low cis-BR), NBR, hydrogenated NBR, hydrogenated SBR), olefin-based rubbers (e.g., ethylene-propylene rubber (EPDM, EPM), maleic acid-modified ethylene-propylene rubber (M-EPM), IIR, copolymers of isobutylene and aromatic vinyl or diene-based monomer, acryl rubber (ACM) and ionomers), halogen-containing rubbers (e.g., Br-IIR, Cl-IIR, brominated isobutylene p-methylstyrene copolymer (Br-IPMS), CR, hydrin rubber (CHR), chlorosulfonated polyethylene (CSM), chlorinated polyethylene (CM), maleic acid-modified chlorinated polyethylene (M-CM), silicone rubbers (e.g., methylvinyl silicone rubber, dimethyl silicone rubber, methylphenylvinyl silicone rubber), sulfur-containing rubbers (e.g., polysulfide rubber), fluororubbers (e.g., vinylidenefluoride-based rubber, fluorine-containing vinyl ether-based rubber, tetrafluoroethylene-propylene-based rubber, fluorine-containing silicone rubber, fluorine-containing phosphagen-based rubber), thermoplastic elastomers (e.g., styrene-based elastomers, olefin-based elastomers, polyester-based elastomers, urethane-based elastomers, polyamide-based elastomers), etc. may be mentioned.

When the compatibilities of the specific thermoplastic resin and elastomer component differ, it is preferable to use a suitable compatibilizer as a third component to make the two components compatible. By mixing a compatibilizer into the system, the interfacial tension between the thermoplastic resin and elastomer ingredient is decreased. As a result, the rubber particles forming the dispersion layer become finer in size, and therefore, the characteristics of the two components are more effectively expressed. As such a compatibilizer, generally, it is possible to adopt the structure of a copolymer having the structure(s) of one or both of the thermoplastic resin and the elastomer components or a copolymer having epoxy groups, carbonyl groups, halogen groups, amino groups, oxazoline groups, hydroxyl groups, etc., capable of reacting with the thermoplastic resin or elastomer component. These compatibilizers may be selected according to the types of the thermoplastic resin and elastomer component to be mixed, but usually a styrene/ethylene-butylene block copolymer (SEBS) and maleic acid modified products thereof, EPDM, EPDM/styrene or EPDM/acrylonitrile graft copolymer and the maleic acid modified products thereof, styrene/maleic acid copolymer, reactive phenoxine, etc. The amount of the compatibilizer is not specifically limited, but preferably is 0.5 to 10 parts by weight, based upon 100 parts by weight of the polymer component (i.e., the total of thermoplastic resin and elastomer ingredient).

The ratio of the specific thermoplastic resin (A) and the elastomer component (B), in the case where the thermoplastic resin and the elastomer are blended, is not particularly limited and may be suitably determined in consideration of the thickness of the film and the balance between the air barrier property and flexibility, but the preferable range is, in terms of weight ratio (A)/(B), 10/90 to 90/10, more preferably 20/80 to 85/15.

Further, in addition to the above essential polymer components, it is possible to mix the other polymers such as the above-mentioned compatibilizing polymer to an extent that the required properties of the polymer composition for a tire of the present invention is not impaired. The objects of mixing the other polymers are to improve the compatibility between the thermoplastic resin and the elastomer component, to improve the film formability of the material, to improve the heat resistance and to decrease costs, etc. As the materials used for this purpose, for example, polyethylene (PE), polypropylene (PP), polystyrene (PS), ABS, SBS, SEBS, polycarbonate (PC), etc. may be mentioned. Further, olefin copolymers such as polyethylene, polypropylene, the maleic acid modified products thereof, or products thereof with the introduced glycidyl groups, etc. may be mentioned. The polymer composition according to the present invention may contain any filler, carbon black, quartz powder, calcium carbonate, alumina, titanium oxide, etc. generally blended into polymer formulations, so long as the requirements of the air permeation coefficient and Young's modulus are not adversely affected.

Further, the elastomer component may be dynamically vulcanized when mixing with the thermoplastic resin. Here, the "dynamic vulcanization" means, when the thermoplastic resin and the elastomer component is mixed, a cross-linking reaction of the elastomer component is simultaneously carried out. For example, Japanese Unexamined Patent Publication (Kokai) No. 2002-12003 etc. describes this "dynamic vulcanizations" in detail. The vulcanization agent, vulcanization aid (or accelerator), vulcanization conditions (temperature and time), etc. in the case of dynamic vulcanization may be suitably determined depending upon the composition of the elastomer component to be added and are not particularly limited. As the vulcanization agent, it is possible to use a general rubber vulcanization agent (or cross-linking agent). Specifically, as a sulfur-based vulcanization agent, powdered sulfur, precipitated sulfur, high dispersion sulfur, surface-treated sulfur, insoluble sulfur, dimorpholine disulfide, alkylphenol disulfide, etc. may be exemplified. For example, it is possible to use about 0.5 to 4 PHR (i.e., parts by weight per 100 parts by weight of rubber component (or polymer)).

Further, as the organic peroxide-based vulcanization agent, benzoyl peroxide, t-butyl hydroperoxide, 2,4-dichlorobenzoyl peroxide, etc. may be exemplified. As the vulcanization accelerator, 2,Te-diethyldithiocarbamate, Cu-dimethyl dithiocarbamate, Fe-dimethyl dithiocarbamate, pipecoline pipecoryl dithiocarbamate, thiourea, etc. may be exemplified.

As the vulcanization accelerator, it is possible to use a general rubber aid together. For example, it is possible to use zinc oxide (about 5 PHR), stearic acid or oleic acid or Zn salts thereof (about 2 to 4 PHR), etc. The method for producing the thermoplastic elastomer composition is to melt upon mixing, in advance the thermoplastic resin component and elastomer component (in the case of rubber, unvulcanized elastomer) by a twin-screw kneader/extruder etc. to disperse the elastomer component as a dispersed phase (i.e., domain) in the thermoplastic resin forming a continuous phase (i.e., matrix phase). When vulcanizing the elastomer component, it is also possible to add a vulcanization agent, while mixing, to dynamically vulcanize the elastomer component. Further, the various types of compounding agents for the thermoplastic resin or elastomer component (except the vulcanization agent) may also be added during the above mixing, but preferably are premixed before the mixing. The kneader used for mixing the thermoplastic resin and the elastomer component is not particularly limited, but a screw extruder, kneader, Bambury mixer, twin-screw kneader/extruder, etc. may be used. Among these, for mixing the thermoplastic resin and the elastomer component and for dynamic vulcanization of the elastomer component, a twin-screw kneader/extruder is preferably used. Further, it is also possible to use two or more types of kneaders for successive mixing. As the condition of the melt mixing, the temperature should be at least a temperature at which the thermoplastic resin melts. Further, the shear rate at the time of mixing is preferably 1000 to 75000 $sec^{-1}$. The overall time of the mixing is 30 seconds to 10 minutes. Further, when a vulcanization agent is added, the vulcanization time after the addition is preferably 15 seconds to 5 minutes. The polymer composition prepared by this method is formed into a sheet-like film by extrusion or calendering. The method of film formation may be the method of forming a film from an ordinary thermoplastic resin or thermoplastic elastomer.

The film thus obtained is structured as a matrix of a thermoplastic resin (A) in which an elastomer component (B) is dispersed as the dispersed phase (i.e., domain). By adopting such a state of a dispersed structure, thermoplastic processing becomes possible and it is possible to impart to the film, which serves as the belt layer reinforcing layer, a sufficient flexibility and a sufficient rigidity by the effect of the resin layer as the continuous phase. Further, regardless of the amount of the elastomer component, it is possible to obtain a shapeability equal to that of the thermoplastic resin at the time of shaping, and therefore, it becomes possible to form a film with an ordinary resin shaping machine, that is, by extrusion or calendering.

The film and the facing rubber layer may be bonded by the method of coating, on the film, a binder comprising a polymer such as an ordinary rubber-based, phenol resin-based, acryl copolymer-based, isocyanate-based and a cross-linking agent dissolved in a solvent and bonding the film and the rubber layer by the heat and pressure at the time of vulcanization and shaping or by the method of coextruding, together with a thermoplastic film, a binder resin such as styrene-butadiene-styrene copolymer (SBS), ethylene-ethyl acrylate (EEA), styrene-ethylene-butylene block copolymer (SEBS), or laminating the same to prepare a multilayer film and bonding the rubber layer at the time of vulcanization. As the solvent-based binder, a phenol resin-based (Chemlock 220, made by Lord Co.), a chlorinated rubber-based (Chemlock 205 or Chemlock 234B), an isocyanate-based (Chemlock 402), etc. may be exemplified.

As shown in FIG. 1, a schematic half-sectional explanatory view in the meridial direction of an example of a pneumatic tire according to the present invention, an inner liner layer 5 of a film of a polymer composition including a thermoplastic resin or a blend of a thermoplastic resin and an elastomer having an air permeation coefficient of $25 \times 10^{-12}$ cc·cm/$cm^2$·sec·cmHg or less and a Young's modulus of 1 to 1000 MPa is provided so as to substantially cover the entire inside circumference of the carcass layer 4. Note that reference numeral 1 is a tread, 2 a belt layer, 3 a belt layer edge, 6 a bead filler, and 7 a bead.

Figure 2:
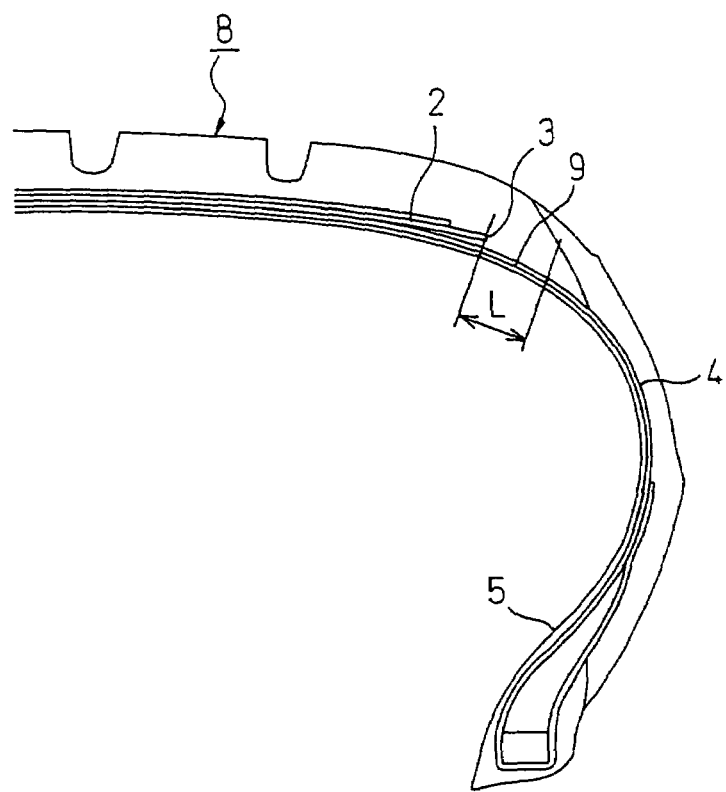
FIG. 2 is an explanatory view of the arrangement of a buffer rubber layer containing short fibers of a pneumatic tire of the present invention.
Figure 3:
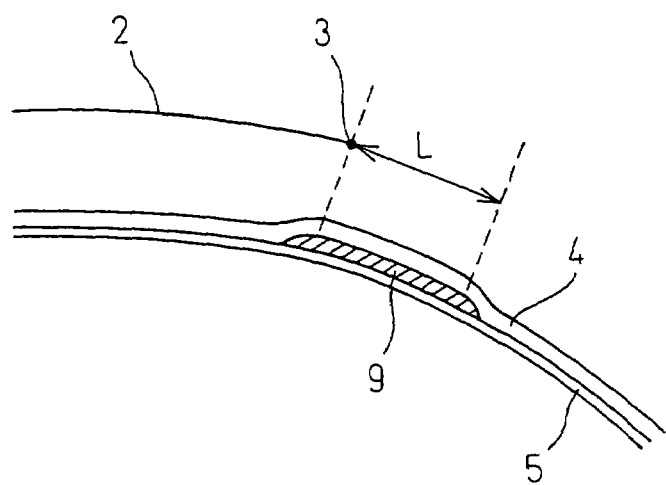
FIG. 3 is an enlarged explanatory view of an example of a part of a pneumatic tire of the present invention where a buffer rubber layer is arranged.

According to the present invention, as shown schematically in FIG. 2 and FIG. 3, a buffer rubber layer 9 including short fibers in regions from the two ends (i.e., edges 3) of the widest belt layer in the belt layers 2 up to ranges of at least 20 mm in the bead directions (see L in FIG. 2) is provided between the carcass layer 4 and the inner liner layer 5. The buffer rubber layer 9 is shown by the example of provision at only the regions of L=20 mm in FIG. 3, but this is an example of provision of the buffer rubber layer 9 at the smallest regions. At the time of actual use, so long as the regions include the buffer rubber layer 9, a region is not particularly limited to this width and may be provided at substantially the entire inside surface (that is, substantially the entire region from one bead 7 to another bead 7). The thickness (i.e., gauge) of the buffer rubber layer 9 is preferably 0.1 to 0.7 mm, more preferably 0.1 to 0.5 mm.

The pneumatic tire according to the present invention may be produced by a conventional production method of a pneumatic tire provided with a tie rubber layer except for using a buffer rubber layer including short fibers, instead of a tie rubber layer.

The rubber composition forming the buffer rubber layer according to the present invention may further include, in addition to the rubber and short fibers, a reinforcing agent, an ordinary vulcanization or cross-linking agent, vulcanization or cross-linking accelerator, various types of oils, an antioxidant, a filler, a plasticizer, or other various types of additives generally included in general rubber. The blend may be mixed by a general method to produce a composition and may be vulcanized or cross-linked. The contents of the additives may be made the conventional general contents so long as the object of the present invention is not adversely affected.

EXAMPLES

The present invention will now be further explained by Examples, but the scope of the present invention is by no means limited to these Examples.

Comparative Examples 1 to 3 and Examples 1 to 3

Preparation of Samples

According to each of the formulations shown in Table I (parts by weight), a 1.7 liter internal Bambury mixer was used to mix all of the components other than the sulfur and the vulcanization accelerator and the short fiber for five minutes, then an 8-inch open roll was used to mix the vulcanization accelerator and the sulfur. The mixture was processed to a sheet which was then arranged as a buffer rubber layer in a tire to obtain a tire for evaluation.

The durability test in these Experiments was conducted by the following method. The results are shown in Table I.

Test Tire

195/65R15 pneumatic tires using films comprising the following materials as inner liner layers were produced in Examples 1 to 3 and Comparative Examples 1 to 3.

Thermoplastic resin components: 33 parts (parts by weight, the same below) of nylon 11 (made by Atofina), 22 parts of nylon 666 (5033B made by Ube Industries);

Elastomer components: 45 parts of a master batch (modified butyl rubber: brominated isobutylene-p-methylstyrene copolymer, 100 parts of Exxon EXXPRO 89-4 made by Exxon Chemical, zinc white: 0.5 part of Zinc Oxide No. 3 made by Seido Chemical Industry, stearic acid: 2 parts of Beads Stearic Acid made by NOF, zinc stearate: 1 part).

The film is formed by mixing, in advance, the thermoplastic resin and the elastomer component by a twin-screw kneader, dispersing the elastomer component in the resin component, then cooling the resultant mix two with water to prepare a pellet-shaped thermoplastic elastomer and shaping the pellets to a film by an ordinary T-die extrusion. Further, as a binding material between the film material and the adjoining member, the film was coated, in advance, with Chemlock 234B (Lord Far East).

On the other hand, in Standard Example 1, butyl rubber film composed of the following materials was used for the inner liner layer:

80 parts of brominated butyl rubber (Bayer Bromobutyl X2 made by Bayer), 20 parts of natural rubber (RSS#3), 60 parts of FEF grade carbon black (HTC#100 made by Nippon Steel Chemical Carbon), 1 part of stearic acid (Beads Stearic Acid made by NOF), 10 part of aromatic oil (Extract No. 4S made by Showa-Shell Oil), 3 parts of zinc oxide (Zinc White #3 made by Seido Chemical Industry), 0.5 part of sulfur (Crystex HSOT20 made by Flexis) and 1 part of vulcanization accelerator (Nocceler DM made by Ouchi Shinko Chemical Industrial).

Note that, in Standard Example 1, the buffer rubber layer was provided over substantially the entire surface at the inside of the tire (that is, substantially the entire region from one bead toe to another bead toe), except for Comparative Example 1.

Test Method

As a road test, a vehicle was driven for one year over 50,000 km, then checked for damage to the inner liner layer. If there was damage, the tire was evaluated as "P (poor)", if there was a little, but there was no problem in practice, the tire was evaluated as "F (fair)", while if there was no damage, the tire was evaluated as "G (good)".

TABLE I

| Formulation (parts by weight) | Stand. Ex. 1 | Comp. Ex. 1 | Ex. 1 | Ex. 2 | Ex. 3 | Comp. Ex. 2 | Comp. Ex. 3 |
| --- | --- | --- | --- | --- | --- | --- | --- |
| Natural rubber*1 | 100 | 100 | 100 | 100 | 100 | 100 | 100 |
| Carbon black*2 | 50 | 50 | 50 | 50 | 50 | 50 | 50 |
| Oil*3 | 10 | 10 | 10 | 10 | 10 | 10 | 10 |
| Stearic acid | 1 | 1 | 1 | 1 | 1 | 1 | 1 |
| Antioxidant*4 | 1 | 1 | 1 | 1 | 1 | 1 | 1 |
| Zinc white | 3 | 3 | 3 | 3 | 3 | 3 | 3 |
| Sulfur*5 | 2 | 2 | 2 | 2 | 2 | 2 | 2 |
| Vulcanization accelerator*6 | 1 | 1 | 1 | 1 | 1 | 1 | 1 |
| Short fiber*7 | — | 3 | 3 | 3 | 3 | 3 | — |
| Buffer rubber layer (mm) | 0.8 | 0 (none) | 0.1 | 0.5 | 1.4 | 1.5 | 0.1 |
| Results of durability test | G | P | G | G | G | G | P |
| Weight (index)[note] | 100 | 89 | 90 | 93 | 99 | 100 | 90 |
| Thickness of inner liner layer (mm) | 0.8 | 0.1 | 0.1 | 0.1 | 0.1 | 0.1 | 0.1 |

[note]Indexed to value of Standard Example of general butyl rubber liner as 100. The smaller the value, the lighter the weight shown.

Footnotes of Table I
*1TSR-20
*2HTC#100 made by Nippon Steel Chemical Carbon
*3Extract No. 4S made by Showa-Shell Oil
*4Nocrack 224 made by Ouchi Shinko Chemical Industrial
*5Crystex HSOT20 made by Flexis
*6Nocceler NS-F made by Ouchi Shinko Chemical Industrial
*7PVA short fiber (average length 2000 μm, average diameter 4 μm)

As clear from the results shown in Table I, Comparative Example 1 has no buffer rubber layer, and therefore the inner liner layer was damaged.

Examples 1 to 3 show that there is no damage to the inner liner if providing a short fiber containing buffer rubber layer having a gauge of at least 0.1 mm. Comparative Example 2 shows that the tire becomes heavier than the weight of current tires if the gauge of the buffer rubber layer exceeds 1.4 mm. Comparative Example 3 shows that, when using buffer rubber not containing any short fiber, compared with containing short fiber, it has a greater amount of the cord of the carcass layer cutting into the inner liner layer side and, as a result, has a lower durability.

Comparative Examples 4 to 6 and Examples 4 to 5

Preparation of Samples

According to each of the formulations shown in Table II (parts by weight), a 1.7 liter internal Bambury mixer was used to mix all of the components other than the sulfur and the vulcanization accelerator and the short fiber for five minutes, then an open roll was used to mix the vulcanization accelerator and the sulfur. The mixture was processed to a sheet which was then arranged as a buffer rubber layer in a tire to obtain a tire for evaluation.

The results are shown in Table II.

The results are shown in Table III.

TABLE III

| | Comp. Ex. 7 | Ex. 6 | Ex. 7 | Comp. Ex. 8 |
|---|---|---|---|---|
| Formulation (parts by weight) | | | | |
| Natural rubber*1 | 100 | 100 | 100 | 100 |
| Carbon black*2 | 50 | 50 | 50 | 50 |
| Oil*3 | 10 | 10 | 10 | 10 |
| Stearic acid | 1 | 1 | 1 | 1 |
| Antioxidant*4 | 1 | 1 | 1 | 1 |
| Zinc white | 3 | 3 | 3 | 3 |
| Sulfur*5 | 2 | 2 | 2 | 2 |
| Vulcanization accelerator*6 | 3 | 3 | 3 | 3 |
| Short fiber*7 | — | 1 | 30 | 40 |
| Buffer rubber thickness (mm) | 0.1 | 0.1 | 0.1 | 0.1 |
| Results of durability test*8 | F | G | G | G |
| Processability | G | G | G | P |

*1 to *7See Table I
*8See Table I
*9Sheets obtained by sheeting by 8-inch open roll and giving neat surfaces indicated by "G (good)" while giving holes etc. indicated by "P (poor)".

TABLE II

| Formulation (parts by weight) | Comp. Ex. 1 | Ex. 4 | Comp. Ex. 5 | Ex. 5 | Comp. Ex. 6 |
|---|---|---|---|---|---|
| Natural rubber*1 | 100 | 100 | 100 | 100 | 100 |
| Carbon black*2 | 50 | 50 | 50 | 50 | 50 |
| Oil*3 | 10 | 10 | 10 | 10 | 10 |
| Stearic acid | 1 | 1 | 1 | 1 | 1 |
| Antioxidant*4 | 1 | 1 | 1 | 1 | 1 |
| Zinc white | 3 | 3 | 3 | 3 | 3 |
| Sulfur*5 | 2 | 2 | 2 | 2 | 2 |
| Vulcanization accelerator*6 | 1 | 1 | 1 | 1 | 1 |
| Short fiber*7 | 3 | 3 | 3 | 3 | — |
| Buffer rubber layer (mm) | 0.5 | 0.5 | 0.5 | 0.5 | 0.5 |
| Location of provision of buffer rubber layer*8 | A | B | C | D | D |
| Width of provision of buffer rubber layer L (mm) | 10 | 20 | 10 | Entire surface | Entire surface |
| Results of durability test(note) | P | G | P | G | P |

(Note) *1 to *7See Table I.
*8A: Provision at only regions 10 mm from two ends of widest belt layer in bead direction
B: Provision at regions 20 mm from two ends of widest belt layer in bead direction
C: Provision in regions of next 10 mm after 10 mm distances from two ends of widest belt layer in bead direction
D: Provision at substantially entire inside surface from one bead end to other bead end From the results of Comparative Examples 4 and 5 and Example 4, it is clear that the regions where the buffer rubber layer is the smallest necessary extent are at least in the range of 20 mm toward the outside. Further, there is also no problem even if the buffer rubber layer is provided over the entire surface like in Example 5.

Comparative Examples 7 and 8 and Examples 6 and 7

Preparation of Sample

According to each of the formulations shown in Table III (parts by weight), a 1.7 liter internal Bambury mixer was used to mix all of the components other than the sulfur and the vulcanization accelerator and the short fiber for 5 minutes, then an 8-inch open roll was used to mix the vulcanization accelerator and the sulfur. The mixture was processed to a sheet which was then arranged as a buffer rubber layer in a tire to obtain an experimental tire for evaluation.

The positions of the buffer rubber layers were all over substantially the entire surface from one bed end to another bead end.

If there are no short fibers as in Comparative Example 7, the spread cord causes the durability of the inner liner layer to be decreased. If the content of the short fibers is 1 part by weight or more based upon 100 parts by weight of rubber as in Examples 6 and 7, it is possible to secure durability of the inner liner layer. However, if the content of the short fibers exceeds 30 parts by weight based upon 100 parts by weight of rubber as in Comparative Example 8, a problem arises in the processability.

INDUSTRIAL APPLICABILITY

By arranging a rubber layer comprising rubber in which short fibers are blended in regions from the edges of the belt layers at the two sides to at least 20 mm outwards, it is possible to suppress the spread cord and secure durability of the inner liner layer, while suppressing an increase in weight.

LIST OF NUMERAL REFERENCE

1 ... Tread
2 ... Belt layer
3 ... Belt edge of widest belt layer
4 ... Carcass layer
5 ... Inner liner layer
6 ... Bead tiller
7 ... Bead
8 ... Pneumatic tire
9 ... Buffer rubber layer
L ... Smallest arrange region (20 mm) of buffer rubber layer containing short fiber

The invention claimed is:

1. A pneumatic tire comprising: a buffer rubber layer containing short fibers arranged between an inner liner layer and a carcass layer, said buffer rubber layer having a thickness of 0.1 mm to 0.5 mm and extending in bead direction at least 20 mm from an edge of a widest width belt layer, said short fibers being formed from polyvinyl alcohol and having a dimension of 0.01 to 10 μm (diameter) and 0.1 to 5 mm (length), and an inner liner layer comprising a film of thermoplastic resin, or a blend of thermoplastic resin and an elastomer, having an air permeation coefficient of not more than $25 \times 10^{-12}$ cc·cm/cm²·sec·cmHg and a Young's modulus of 1 to 1000 MPa, wherein the buffer rubber layer containing short fibers is arranged between the inner liner layer and a carcass layer in bead directions from two ends of a widest belt layer in ranges of at least 20 mm.

2. A pneumatic tire as claimed in claim 1, wherein a content of said short fibers is 1 to 30 parts by weight, based upon 100 parts by weight of rubber of said buffer rubber layer.

3. A pneumatic tire as claimed in claim 1, wherein said buffer rubber layer extends one bead to another bead.

* * * * *